Nov. 18, 1930.  N. R. BROWNYER  1,782,192
CAR TRUCK
Filed Dec. 13, 1929   2 Sheets-Sheet 2
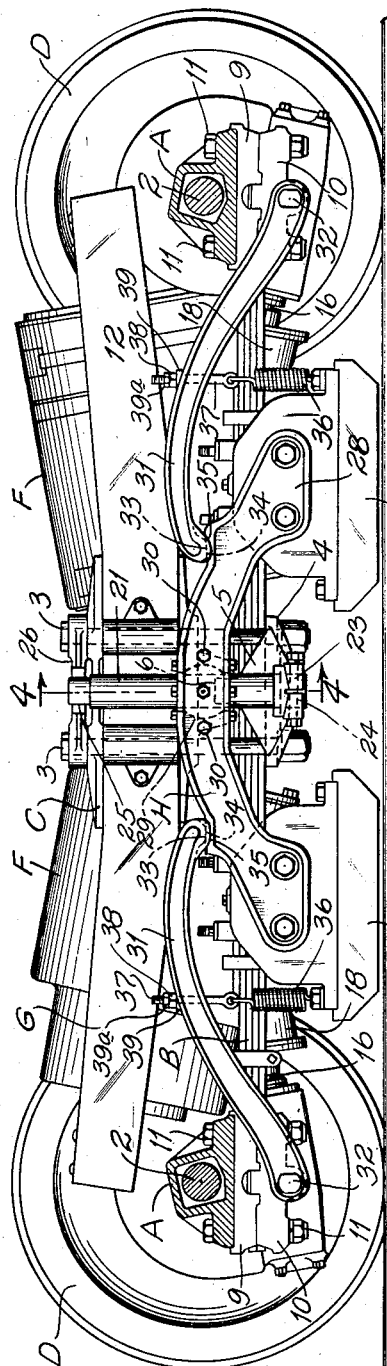
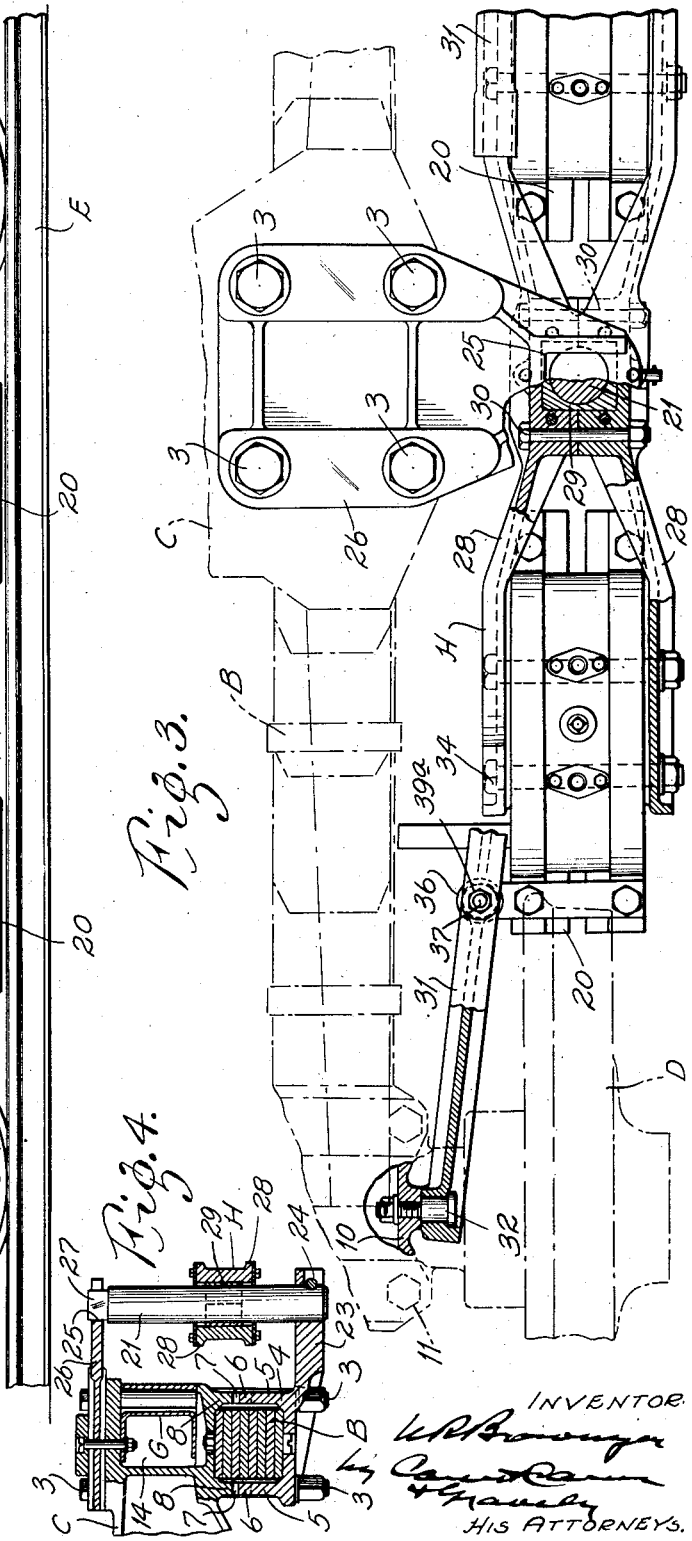
INVENTOR
HIS ATTORNEYS.

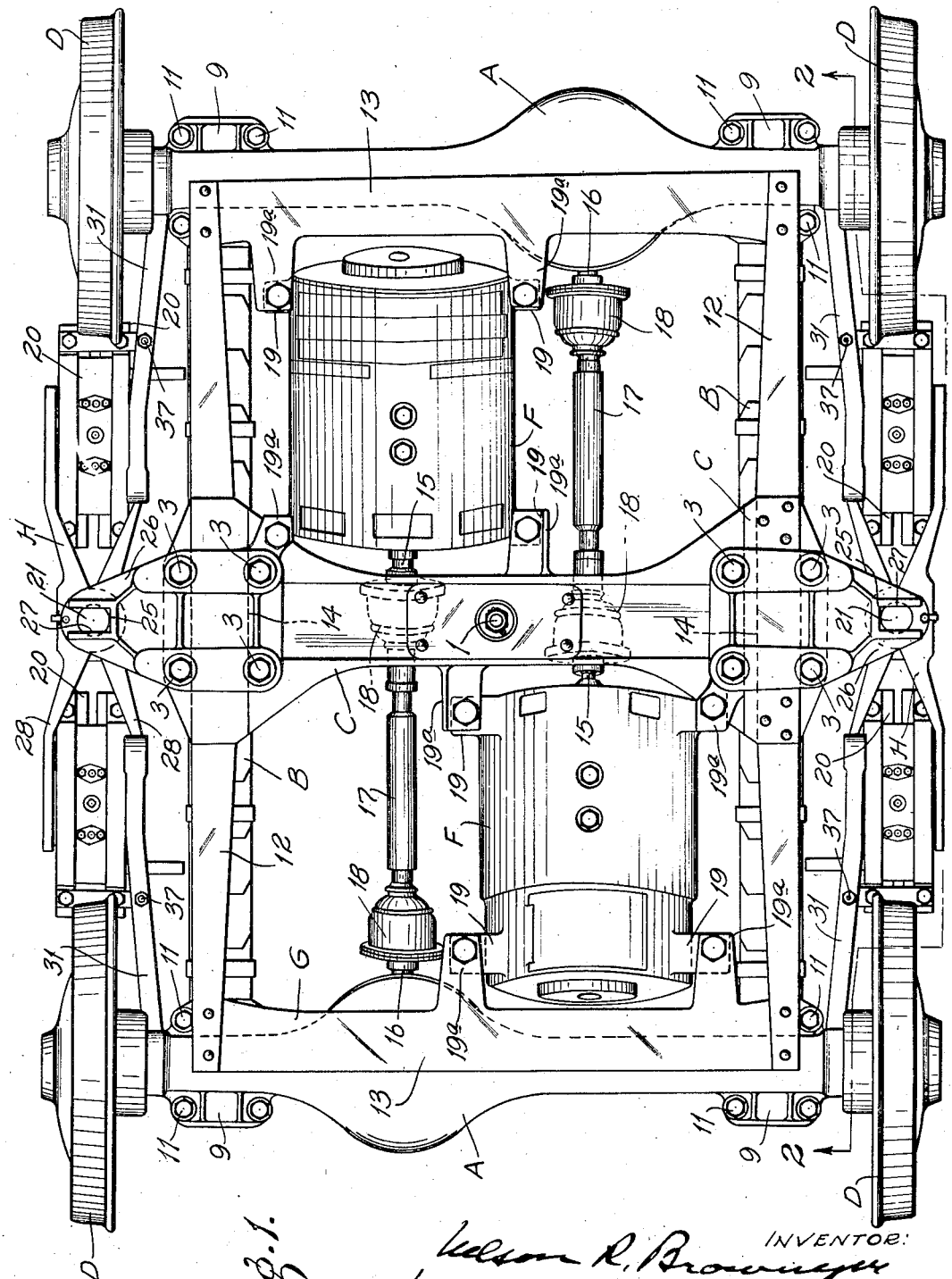

Patented Nov. 18, 1930

1,782,192

UNITED STATES PATENT OFFICE

NELSON R. BROWNYER, OF DETROIT, MICHIGAN, ASSIGNOR TO THE TIMKEN-DETROIT AXLE COMPANY, OF DETROIT, MICHIGAN, A CORPORATION OF OHIO

CAR TRUCK

Application filed December 13, 1929. Serial No. 413,766.

This invention relates to car trucks, and particularly to electromagnetic track brakes for street car trucks. It has for its principal objects to provide for the adjustment of the brake shoes relative to the rail, to provide for taking care of the braking reaction or thrust when the brakes are applied, to permit the shoes to swing upwardly to clear obstructions on the rails, to maintain the desired clearance between the shoes and rails regardless of spring deflection, and to provide for simplicity and cheapness of construction and compactness of design. The invention consists principally in the brake mounting and in the parts and arrangement of parts hereinafter described and claimed.

In the accompanying drawing, which forms part of the specification and wherein like symbols refer to like parts wherever they occur, Fig. 1 is a plan view of a street car truck provided with an electromagnetic track brake embodying my invention, Fig. 2 is a vertical longitudinal section on the line 2—2 in Fig. 1, Fig. 3 is a plan view, partly in horizontal section, of the brake mechanism on one side of the truck, the adjacent portion of the truck being shown in dot-and-dash lines; and Fig. 4 is a vertical section on the line 4—4 in Fig. 2.

Referring to the accompanying drawings, my invention is shown in connection with a motor driven street car truck comprising two axle housings A, semi-elliptical longitudinal side springs B connecting the corresponding ends of said axle housings, and a rigid truck bolster C connecting the side springs about midway of their length. The truck bolster C is provided at its center with the center pin or king bolt 1 of a suitable center bearing (not shown) on which the car body is supported and about which the truck swivels. Wheels D run on the rails E of the track and are secured to the outer ends of the axle shaft sections 2 that are rotatably mounted in the axle housings A and operatively connected by differential mechanisms (not shown) interposed between them.

Each end of the truck bolster C is supported on and rigidly clamped to the side spring B located therebelow by means of vertical clamping bolts 3, which extend through alined openings provided therefor in said truck bolster and in a saddle block 4 located beneath said spring. This saddle block is provided with upstanding side flanges 5 which terminate at their upper ends in tongues 6 that fit within downwardly opening notches 7 provided therefor in lugs 8 that depend from the ends of the bolster on opposite sides of the spring.

Each side spring B comprises a series of leaves superposed one upon the other and gradually increasing in length from top to bottom. At each end of each side spring the two bottom leaves thereof extend beneath and are secured to the end of the axle housing A located adjacent thereto by cooperating upper and lower spring seats 9 and 10, respectively. Said spring seats, with the ends of the two long bottom leaves of the spring B disposed therebetween, are secured to the underside of the adjacent axle housing A by means of four vertical bolts 11 which pass through alined openings provided therefor in said axle housing and in the four corners of said spring seats.

In the construction of street car truck illustrated, the axle shaft sections 2 of the two differential driving axles A are driven by separate driving motors, preferably electric motors F, supported in a rectangular frame G located above said axles and the longitudinal side springs B which connect them together. The motor supporting frame G comprises channel-shaped side rails 12 that are connected by end members 13 and are disposed with their webs vertical and with their top and bottom flanges extending inwardly. The side rails 12 of the motor supporting frame G are supported intermediate their ends in outwardly opening recesses 14 provided therefor in the ends of the truck bolster C and are riveted or otherwise rigidly secured thereto.

The two driving motors F are preferably arranged on opposite sides of the truck bolster C and also preferably arranged on opposite sides of the longitudinal center line of the truck. Each motor F lies between the truck bolster C and one of the axles A and is operatively connected to drive the axle that is more distant from it. The armature shaft 15 of each motor is connected to a worm propeller shaft 16 of the differential driving axle driven thereby by a transmission shaft 17 having universal joint connections 18 at its respective ends with said armature shaft and said worm propeller shaft. The outer end of each motor F is preferably tilted higher than the inner end thereof, and the worm shaft 16 and transmission shaft 17 are also tilted at about the same angle as the motor. Each motor F is partly suspended at the truck bolster C and the adjacent end member 13 of the motor supporting frame G; and for this purpose the outer and inner ends of said motors are provided with lugs 19 adapted to be bolted to similar lugs or brackets 19ª on the bolster C and on the end members 13 of the motor supporting frame G.

The above truck is provided with a track brake, which preferably comprises four electromagnetic rail engaging brake shoes 20 arranged two on each side of the truck outside of the leaf spring B and between the two wheels D on that side of said truck. The two brake shoes 20 are disposed immediately above and are spaced apart longitudinally of the rail E that supports the two wheels D between which said shoes are located. The two shoes 20 are bolted or otherwise rigidly connected to the respective ends of a tie member H which has a vertical sliding connection midway of its ends with a vertical shaft or post 21 whose lower end is supported on a horizontal lug 23 which projects outwardly from the saddle block 4 that is located beneath the spring B and clamps the latter to the end of the bolster C. The lower end of the post is firmly clamped by means of a bolt 24 in an opening in the saddle block 4, whereby said post is adapted for movement with said spring during deflection thereof. The upper end of the post 21 has a sliding fit in a notch 25 provided therefor in the outer end of a plate 26 which is bolted to the top of the bolster C at the end thereof. The faces of the post 21 that face the sides of said notch 25 in the plate 26 are flattened, as at 27, so as to prevent rotation of said post.

For purposes of assembly, the tie or brake shoe connecting member H is split vertically along its longitudinal center line; that is, it comprises duplicate half sections 28 whose opposing faces are provided intermediate their ends with mating or registering cylindrical recesses that cooperate to form a cylindrical cavity or socket whose axis is disposed horizontally and extends transversely of the tie member H. Located in said cavity or socket is a cylindrical member 29 that is slidably mounted on the upright shaft or post 21. The two half sections 28 of the tie member H are rigidly secured together, with the cylindrical member 29 clamped therebetween by means of bolts 30 located on opposite sides of the socket for said cylinder. The half sections 28 of the member diverge from each other from the cylinder receiving socket towards their ends, forming bifurcations at the ends of said tie member between which are located the brake shoes 20.

The two vertical movable brake shoes 20 and their connecting bar H are supported from the unsprung parts of the truck (the two axle housings A) by means of two arms 31 that extend longitudinally of the truck adjacent to the ends of said connecting bar. As shown in the drawing, one end of each arm 31 extends beneath an axle housing A and is pivotally secured to the outside face of the lower spring seat 10 by means of a horizontal pivot stud 32 which is bolted to said spring seat. Each arm 31 is curved upwardly over the adjacent end of the tie bar H and the brake shoe 20 thereon and terminates at its free end in a convexly curved bottom surface 33 which bears on a horizontal seat 34 provided therefor on the top face of the inner branch of the bifurcated end portion of said tie bar. The free end of each arm 31 is also provided with depending side marginal flanges 35 that extend below the seat 34 on opposite sides of the tie bar H and thus prevent rotation of said bar about the axis of the post 21 upon which it slides. The tie bar H and the two supporting arms 31 therefor are held together with the free end of each arm in engagement with the seat 34 provided therefor on said tie bar, by means of two vertically disposed coil springs 36. Each spring is connected at its lower end to the outer end of a brake shoe 20 and at its upper end to the lower end of a bolt 37 that is slidable in a vertical hole provided therefor in the adjacent arms 31. Each bolt 37 is suspended from an arm 31 by means of a nut 38 which is threaded on the upper end of the bolt and rests on a boss 39 provided therefor in the upper surface of the arm. The nut 38 serves as means for raising and lowering the bolt 37 to vary the distance between the brake shoe 20 and the rail E; and a nut 39ª is threaded on the upper end of said bolt for locking the adjusting nut 38 thereon.

By the arrangement described, the coil springs 36 serve to hold together the tie member H and the two arms 31, thereby forming a self-sustaining brake shoe supporting frame that will yield slightly intermediate its ends and permit said tie member to slide downwardly on the post 21 against the tension of the coil springs 36. When the shoes are deenergized, the coil springs 36 operate to return the frame to its normal position and thus lift the shoes off the rails, when the electromagnetic brake shoes 20 are energized to attract them to the rails E. The coil springs 36 are adjustable by means of the threaded bolts 37 to secure the desired clearance between the shoes 20 and rails; and the free ends of the arms 31 of the supporting frame are shaped to straddle the tie member and thus serve to hold the supporting frame and tie member in correct transverse relation. The slidable cylindrical sleeve connection 29 between the tie member H and the post 21 allows either end of said tie member to swing upwardly and thus permit the shoes to clear obstructions on the rails. The entire shoe supporting frame is supported from the unsprung portion of the truck and has a sliding connection with the post 21 that is movable with the side springs 13, with the result that no movement is imparted to the shoes when spring deflection occurs and the clearance between the shoes and rails remains the same at all times. When the brakes are applied, the resulting brake reaction or thrust is transmitted through the tie member H to the post 21, which forms an abutment for resisting such thrust.

Obviously, the hereinbefore described brake mechanism admits of considerable modification without departing from the invention, and I do not wish to be limited to the precise brake mechanism or type of truck shown and described.

What I claim is:

1. A track brake comprising two arms adapted to extend longitudinally of the track and spaced apart from each other, supports for the remote ends of said arms permitting vertical swinging movement thereof, a member extending longitudinally of said track between the spaced ends of said arms, a brake shoe fixed to said member, and means for holding the adjacent ends of said arms and said member together to form a downwardly yieldable supporting frame for said brake shoe.

2. A track brake comprising two arms adapted to extend longitudinally of a rail and spaced apart from each other, supports for the distant ends of said arms permitting vertical swinging movement thereof, a member extending longitudinally of said rail between the spaced ends of said arms, a rail engaging brake shoe fixed to said member, and means for holding the adjacent ends of said arms and said member together to form a self-sustaining downwardly yieldable supporting frame for said brake shoe.

3. A track brake comprising two arms pivotally supported at one end for vertical swinging movement, a member extending between the free ends of said arms, a brake shoe fixed to said member, and means for holding the free ends of said arms and said members together to form a downwardly yieldable supporting frame for said brake shoe.

4. A track brake comprising two arms adapted to extend longitudinally of a rail and spaced apart from each other, supports for the distant ends of said arms permitting vertical swinging movement thereof, a member extending longitudinally of said rail between the spaced ends of said arms, the free ends of said arms overlapping the adjacent ends of said member, a rail engaging brake shoe carried by said member, and springs for yieldably holding the overlapping ends of said arms and said member in engagement with each other.

5. A track brake comprising two arms adapted to extend longitudinally of a rail and spaced apart from each other, supports for the distant ends of said arms permitting vertical swinging movement thereof, a member extending longitudinally of said rail between the spaced ends of said arms, the free ends of said arms overlapping the adjacent ends of said member, a rail engaging brake shoe carried by said member, springs for yieldably holding the overlapping ends of said arms and said member in engagement with each other, and means on said arms cooperating with means on said member for preventing relative sidewise movement of said arms and said member.

6. A track brake comprising two arms adapted to extend longitudinally of a rail and spaced apart from each other, supports for the distant ends of said arms permitting vertical swinging movement thereof, a member extending longitudinally of said rail between the spaced ends of said arms, the free ends of said arms overlapping the adjacent ends of said member, a rail engaging brake shoe carried by said member, springs for yieldably holding the overlapping ends of said arms and said member in engagement with each other, means on said arms cooperating with means on said member for preventing relative sidewise movement of said arms and said member, and means for preventing endwise movement of said member.

7. A track brake comprising two arms adapted to extend longitudinally of a rail and spaced apart from each other at one end, supports for the distant ends of said arms permitting vertical swinging movement thereof, a member extending longitudinally of said rail between the spaced ends of said arms, the free ends of said arms overhanging the adjacent ends of said member, a rail engaging brake shoe carried by said member, springs for yieldably holding the overhanging ends of said arms in engagement with said member, and means for adjusting said springs to obtain the desired clearance between the shoe and the rail.

8. A track brake comprising two arms disposed in endwise alinement longitudinally of a rail and spaced apart at their adjacent ends, supports for the remote ends of said arms permitting vertical swinging movement thereof, a member extending from arm to arm with its ends disposed beneath the free ends thereof, a rail engaging brake shoe carried by said member, springs for holding together the adjacent ends of said arms and said member, and means for adjusting said springs to obtain the desired clearance between the brake shoe and the rail.

9. A track brake comprising two arms disposed in endwise alinement longitudinally of a rail and spaced apart at their adjacent ends, supports for the remote ends of said arms permitting vertical swinging movement thereof, a member extending from arm to arm with its ends disposed beneath the free ends thereof, a rail engaging brake shoe carried by said member, springs for holding together the adjacent ends of said arms and said member, means for adjusting said springs to obtain the desired clearance between the brake shoe and the rail, said means comprising bolts slidable in said arms and connected to said springs, and nuts threaded on said bolts and bearing against the upper surfaces of said arms.

10. A track brake comprising two arms adapted to extend longitudinally of a rail and spaced apart from each other, supports for the distant ends of said arms permitting vertical swinging movement thereof, a member extending longitudinally of said arms with its ends extending beneath the spaced ends thereof, rail engaging shoes fixed to the ends of said member, and coil springs connecting the outer ends of said brake shoes with the arms located thereabove.

11. A railway car truck having unsprung parts, and a track brake for said truck, said track brake comprising two arms disposed in endwise alinement longitudinally of each rail and spaced apart at their adjacent ends, supports on the unsprung parts of said truck for the remote ends of said arms permitting vertical swinging movement thereof, a member spanning the space between said arms with its ends extending beneath the free ends thereof, rail engaging shoes fixed to the ends of said member, and springs for holding the overlapping ends of said arms and said member in engagement with each other.

12. A railway car truck having unsprung parts, and a track brake for said truck, said track brake comprising two arms extending longitudinally of each rail and spaced from each other, means for pivotally securing distant ends of said arms to the unsprung parts of said truck whereby said arms are adapted for vertical swinging movement, a member spanning the space between said arms with its ends extending beneath the free ends of said arms, rail engaging shoes fixed to the ends of said member, springs for holding the overlapping ends of said arms and said member in engagement with each other, and means for adjusting said springs to obtain the desired clearance between the shoes and rail.

13. A railway car truck having sprung and unsprung parts, and a track brake for said truck, said track brake comprising two arms extending longitudinally of each rail with their adjacent ends spaced from each other, means for pivotally securing the distant ends of said arms to the unsprung parts of said truck whereby said arms are adapted for vertical swinging movement, a member spanning the space between said arms with its ends extending beneath the free ends of said arms, rail engaging shoes fixed to the ends of said member, springs for holding the overlapping ends of said arms and said member in engagement with each other, means for adjusting said springs to obtain the desired clearance between the shoes and rail, and a post secured to the sprung parts of said truck and slidable through an opening provided therefor in said shoe supporting member.

14. A railway car truck having sprung and unsprung parts, and a track brake for said truck, said track brake comprising two arms extending longitudinally of each rail and spaced at their adjacent ends, means for pivotally supporting the remote ends of said arms on the unsprung parts of said truck whereby said arms are adapted for vertical swinging movement, a member spanning the space between said arms with its ends extending beneath the free ends of said arms, rail engaging shoes fixed to the ends of said member, springs for holding the overlapping ends of said arms and said member in engagement with each other, means for adjusting said springs to obtain the desired clearance between the shoes and rail, a post secured to the sprung parts of said truck and slidable through a vertical opening provided therefor in said shoe supporting member, and means for permitting tilting movement of said shoe connecting member on said post.

15. A railway car truck having sprung and unsprung parts, and a track brake for said truck, said track brake comprising two arms extending longitudinally of each rail and spaced from each other, means for pivotally securing the distant ends of said arms to the unsprung parts of said truck whereby said arms are adapted for independent vertical swinging movement, a member spanning the space between said arms with its ends extending beneath the free ends of said arms, rail engaging shoes fixed to the ends of said member, springs for holding the overlapping ends of said arms and said member in engagement with each other, means for adjusting said springs to obtain the desired clearance between the shoes and rail, a post mounted on the sprung parts of said truck and slidable through a vertical opening provided therefor in said shoe supporting member, and a cylindrical member sleeved on said post and seated in a cylindrical socket provided therefor in the post receiving opening in said shoe connecting member.

16. A railway car truck comprising axle housings, side springs connecting corresponding ends of said housings, and a track brake on each side of said truck, said track brake comprising a member disposed longitudinally of the truck between the two wheels on one side of said truck, electromagnetic rail engaging shoes fixed to the ends of said member, arms pivotally supported on the respective axle housings with the free ends thereof overhanging the adjacent ends of the shoe supporting member, springs for holding the overlapping ends of said arms and said shoe supporting member in engagement with each other, a post supported on the adjacent side spring of said truck and slidable through a vertical opening provided therefor in said shoe supporting member, and means for permitting tilting movement of said shoe connecting member on said post.

17. A railway car truck comprising axle housings, side springs connecting corresponding ends of said housings, and a track brake on each side of said truck, said track brake comprising a member disposed longitudinally of the truck between the two wheels on one side of said truck, electromagnetic rail engaging shoes fixed to the ends of said member, arms pivotally supported on the respective axle housings with the free ends thereof overhanging the adjacent ends of the shoe supporting member, springs for holding the overlapping ends of said arms and said shoe supporting member in engagement with each other, means for adjusting said springs to obtain the desired clearance between the shoes and rail, a post supported on the adjacent side spring of said truck and slidable through a vertical opening provided therefor in said shoe supporting member, and means for permitting tilting movement of said shoe connecting member on said post, said means comprising a cylindrical member sleeved on said post and seated in a cylindrical socket provided therefor in said shoe connecting member.

Signed at Detroit, Michigan, this 5th day of December, 1929.

NELSON R. BROWNYER.